R. C. SHOWALTER.
NUT LOCK.
APPLICATION FILED DEC. 2, 1911.

1,143,450.

Patented June 15, 1915.

Witnesses
C. E. Kemper
James Koehl

Inventor
Roy C. Showalter
By Victor J. Evans
Attorney

UNITED STATES PATENT OFFICE.

ROY C. SHOWALTER, OF ALTOONA, PENNSYLVANIA.

NUT-LOCK.

1,143,450.  Specification of Letters Patent. Patented June 15, 1915.

Application filed December 2, 1911. Serial No. 663,517.

*To all whom it may concern:*

Be it known that I, ROY C. SHOWALTER, a citizen of the United States, residing at Altoona, in the county of Blair and State of Pennsylvania, have invented new and useful Improvements in Nut-Locks, of which the following is a specification.

This invention relates to nut locks, and has for an object to provide means whereby the nut can be positively held against retrograde movement on the bolt.

A still further object of the invention is to provide locking means which can be readily removed from the nut when it is desired to remove the latter from the bolt.

A still further object of the invention is to provide means on the nut to receive or engage a portion of the nut locking means so as to hold the same against casual displacement when in use.

Figure 1:
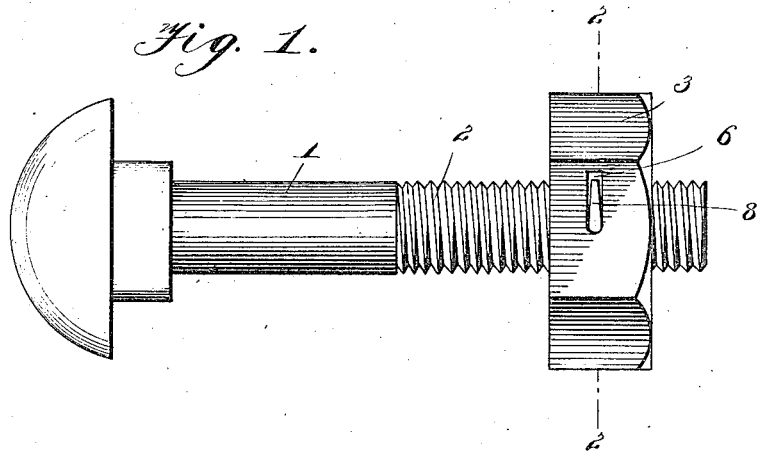
Figure 2:
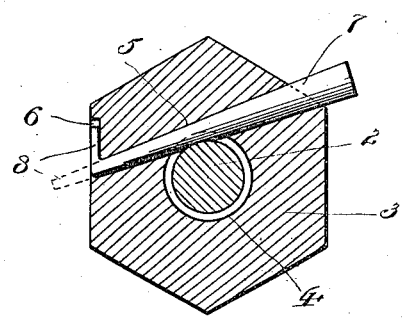

In the drawing, forming a portion of this specification and in which like numerals of reference indicate similar parts in the several views:—Figure 1 is a side view showing the application of the nut lock to a nut. Fig. 2 is a section on line 2—2 of Fig. 1.

Referring to the drawing the bolt 1 is of usual construction, being provided with the well known form of threaded shank 2. The nut 3 is also substantially of well known configuration and construction, being provided with a central bore 4 to receive the shank 2.

A substantially conical passage 5 is formed in the nut 3, and as shown, this passage opens intermediate of its ends into the bore 4 of the nut for a purpose to be hereinafter described. The passage 5 opens at its ends onto the flat sides of the nut, and at the small end of the passage communicates with a recess 6 in the nut. The locking key 7 is substantially of elongated conical configuration so as to snugly fit in the passage 5 of the nut. The key may be made of steel or other hard metal, and, in use, it is seen that when it is extended through the passage 5 a portion of the key will be extended through the bolt opening 4 to become positively engaged with the shank 2, whereby the nut will be positively held against retrograde movement thereon. The small end 8 of the locking key is adapted to be bent into the recess 6 of the nut, whereby the key will be securely held against accidental displacement when in use. When it is desired to release the locking means from the bolt the portion 8 is bent to its original position and it may be struck so that the key can be forced from the passage 5 and entirely disengaged from the shank 2.

It is to be noted that the slot or recess 6 is placed on the side of the nut 3 in such a manner that it will form an acute angle in its union with the passage 5 so that when the locking key 7 is bent at 8 to be seated in said recess, the bent end of the locking key will also form an acute angle at the bend.

I claim:

In a nut lock, a threaded bolt having an adjustable nut thereon provided with a tangential tapering passage which communicates intermediate of its ends with the bolt opening in said nut and which terminates at one end in a recess that lies at an angle thereto, a shoulder being formed at the juncture of the recess with the passage, and a tapering key adapted to be driven into said passage in the nut and to have its small end bent over said shoulder so as to be in said recess, the walls of the recess being so arranged as to prevent turning of said key when the small end is bent into said recess.

In testimony whereof I affix my signature in presence of two witnesses.

ROY C. SHOWALTER.

Witnesses:
 ROY S. GEEDEN,
 PATRICK J. RYDER.